United States Patent [19]
Korthuis

[11] Patent Number: 4,750,322
[45] Date of Patent: Jun. 14, 1988

[54] APPARATUS FOR DISLODGING AND COLLECTING PRODUCE FROM UPSTANDING CROPS

[75] Inventor: Donald L. Korthuis, Lynden, Wash.

[73] Assignee: Korvan Industries, Inc., Lynden, Wash.

[21] Appl. No.: 875,631

[22] Filed: Jun. 18, 1986

[51] Int. Cl.$^4$ ............................................. A01D 46/26
[52] U.S. Cl. ...................................... 56/328.1; 56/330
[58] Field of Search ....................... 56/328 R, 330, 331

[56] References Cited

U.S. PATENT DOCUMENTS

| | | | |
|---|---|---|---|
| 3,613,343 | 10/1971 | Sagouspe et al. | 56/330 |
| 4,085,572 | 4/1978 | Bruel | 56/330 |
| 4,538,406 | 9/1985 | Littau | 56/328 R X |
| 4,561,241 | 12/1985 | Burns | 56/330 |

FOREIGN PATENT DOCUMENTS 2411552  8/1979  France ................... 56/330
2559994  8/1985  France ................... 56/328 R Primary Examiner—Stephen J. Novosad
Assistant Examiner—David J. Bagnell
Attorney, Agent, or Firm—Hughes, Cassidy & Multer

[57] ABSTRACT

An agricultural harvester for rowed crops, such as berry bushes, includes a wheeled chassis having an enclosure formed by a pair of upstanding fore and aft extending sidewalls. The harvester is driven in a manner that the berry bushes enter the front of the enclosure and exit from the rear. A stabilizing and displacing assembly is located toward the front of the enclosure to dislodge the fruit from the bushes when the bushes are within the enclosure, and to minimize any dislodging of fruit forward or rearward of the enclosure. The fruit is dislodged by a side-to-side transverse movement of the bush which is caused by a set of middle displacing rods. The bush is stabilized by forward and rearward stabilizing rods which act in opposition to the middle displacing rods.

17 Claims, 10 Drawing Sheets

APPARATUS FOR DISLODGING AND COLLECTING PRODUCE FROM UPSTANDING CROPS

TECHNICAL FIELD

The present invention relates to apparatus and methods for dislodging and collecting produce from produce bearing plants, and more particularly to apparatus and methods for dislodging and collecting berries from berry bushes which are planted in rows.

BACKGROUND OF THE INVENTION

The harvesting of fruit, such as berries, from fruit bearing bushes and vines which are planted in rows, involves a number of practical and economic considerations. First, there is a requirement that the berries be harvested as quickly as possible. A typical berry harvesting season may last four to six weeks. When the berries ripen, there is a short time span in which they must be picked or they will overripen and become unmarketable. Sometimes this requires that the berries be harvested every other day during the harvesting season so that it is not uncommon for a bush to be harvested twelve to eighteen or more times in a single season. To accomplish this within the allotted time, the harvesting operation must be expeditious.

In addition to picking speed, it is desirable that only those berries which are in fact ripe be dislodged from the bushes. However, as just mentioned, the fruit on many berry plants does not ripen at the same time. Any unripe fruit which is dislodged during a picking operation is generally not suitable for market and therefore reduces the overall yield of the bush.

With the rise in cost of manual picking, an increasingly greater share of the berry picking is being done by machinery. These machines are commonly mounted on a wheeled chassis and include an enclosure formed by two spaced apart upstanding sidewalls which extend in a parallel fore and aft direction. They also include a number of mechanically driven beater rods which strike at the bushes in order to dislodge the berries when the bushes are inside the enclosure. At the bottom of the sidewalls is a collecting floor including a collecting conveyor which collects the berries as they fall from the bushes and transports them to a collecting area.

To optimize yields, it is desirable that the berries be collected in a manner that the loosely held ripe fruit is dislodged from the bushes, while the more tightly held unripe fruit remains on the bushes to ripen. With berry bushes, however, many of the berries grow on long laterally extending fruit spurs which grow outwardly from the bush, but which constitute new growth and therefore are somewhat fragile and subject to easily breaking off. However, a dislodging force which is not sufficient to dislodge an unripe berry from the fruit spur, may be sufficient to break off the fruit spur from the bush, resulting in the loss of those unripe berries. Thus, the harvesting of berries is a tradeoff between speed of harvesting versus damage to the berry bush and resulting decreasing yield. That is, in a conventional operation, greater harvesting speed is often achieved by increasing the speed and impact force of the beater rods upon the bushes in order to increase the rate at which the berries are dislodged. The greater speed and impact of the beater rods, however, causes many of these fruit spurs to be broken off from the bushes and thereby decreases the overall fruit yield of the bush.

As indicated above, a factor instrumental in the harvesting of berries is the maximization of the collection yield of berries which have been dislodged from the bushes. Collection of these berries by the berry picking machines is typically performed by the collecting plates which are located on the floor of the machine. In conventional berry picking machines, some of the fruit is dislodged from the bushes both in front and behind the machine and therefore is not collected within the enclosure. This is a result of the bushes being closely engaged in longitudinally extending rows so that movement of the bush by the beater rods within the harvester enclosure is transmitted or "telegraphed" forwardly and rearwardly from the machine to those bushes outside the enclosure. The resulting movement of the bushes outside the harvester enclosure not only causes those unpicked ripe berries in front of the machine to be dislodged and fall to the ground where the machine is unable to collect them, but it can cause those ripe berries which are still attached to the bushes behind the machine to fall to the ground.

Other conventional apparatus and methods for harvesting fruit have been disclosed. For example, a harvester having reciprocating beater elements is disclosed in U.S. Pat. No. 3,686,842 and U.S. Pat. No. 3,685,264, both by Littau. Harvesters having (i) vibrating beater elements are shown in U.S. Pat. No. 3,485,027 by Ganger; (ii) rotating beater elements are shown in U.S. Pat. No. 3,245,211 by Weygandt et al; (iii) beater elements with different phases are shown in U.S. Pat. No. 3,939,629 by Bruel; and (iv) adjustable variable angle beater elements are shown in U.S. Pat. No. 4,435,950 by Deux et al.

In addition to the aforementioned harvesting machines, harvesters having beater elements which are mounted to movable upstanding posts have been disclosed. These include laterally and/or angularly adjustable posts as shown in U.S. Pat. No. 3,184,908 by Rust; U.S. Pat. No. 3,473,311 by Fox; U.S. Pat. No. 3,890,774 by Bruel; as well as U.S. Pat. No. 4,022,001; U.S. Pat. No. 4,292,792; and U.S. Pat. No. 4,063,406, all by Burton. Furthermore, spring biased laterally movable beater support posts are disclosed in U.S. Pat. No. 3,478,501 by Patzlaff; and U.S. Pat. No. 4,114,463 by Garden et al.

Other harvesters having laterally extending beater elements mounted to upstanding posts for horizontal and/or vertical movement are disclosed in U.S. Pat. No. 3,727,388 by Smith; and U.S. Pat. No. 4,251,983 by Burton. In U.S. Pat. No. 4,282,705 by Fontan, the beater elements are inclined from the horizontal. In Patzlaff, U.S. Pat. No. 3,611,689, two sets of beater elements are shown, one set being staggered longitudinally behind the other set of beater elements. Two pairs of longitudinally separated beater elements are also shown in U.S. Pat. No. 4,251,983 by Burton.

Additional harvesting machines are also disclosed in U.S. Pat. No. 2,671,301 by Harrison; U.S. Pat. No. 3,768,240 by Lyon; U.S. Pat. No. 2,447,122 by Horst, Jr.; and U.S. Pat. No. 4,445,316 by Browning et al.

SUMMARY OF THE INVENTION

The present invention pertains to an agricultural harvester for crops which are planted in rows. The harvester includes a frame which is mounted on a wheeled chassis and which includes a harvesting enclosure which is open at the front and rear. The harvester is driven along the crop rows so that a portion of the crop row enters the front of the enclosure between the sidewalls and exits from the rear.

In order to remove the fruit from the bushes, a crop dislodging assembly is operatively connected to the frame inside of the harvester enclosure. The crop dislodging means includes crop displacing means for moving the middle part of the crop row portion in a generally transverse side-to-side manner. The crop displacing means includes first and second transversely spaced apart displacing elements which are adapted to engage the first and second sides of the middle part of the crop row portion therebetween. The crop dislodging means also includes crop stabilizing means which are located forward of the crop displacing means and which limit movement of the forward part of the crop row portion in the side-to-side direction. The forward crop stabilizing means includes first and second transversely spaced apart stabilizing elements which are adapted to engage the first and second sides of the forward part of the crop row portion therebetween. The harvester also includes crop dislodging and stabilizing drive means including motor means which are operatively connected to the crop dislodging means in a manner to cause (i) the first displacing elements to move in a first general transverse direction in engagement with the first side of the crop row portion so as to cause the middle part of the crop row portion to move in the first transverse direction, (ii) the second stabilizing elements of the forward stabilizing means to move in engagement with the second side of the crop row portion in a second transverse direction which is generally opposite to the first transverse direction to oppose movement of the forward part of the crop row portion in the first transverse direction, and (iii) the first stabilizing elements to move in cooperation with the second stabilizing elements in the second transverse direction to a location where the first stabilizing elements have a substantial alignment component which is parallel to the longitudinal axis of the enclosure so as to engage the second side of the crop row portion forward part in order to inhibit movement of the forward part of said crop row portion in the second transverse direction.

In an exemplary embodiment, the crop dislodging assembly includes front and rear stabilizing means, and middle displacing means. The stabilizing and displacing means include left, right upstanding support posts which and adjustable transversely inward and outward within the enclosure; and a plurality of horizontally extending flexible rods which are connected to the upstanding support posts. The support posts are rotated about their upstanding axes by a drive assembly in a manner that while the middle displacing rods cause a middle portion of the bush to be displaced from side-to-side within the enclosure in order to dislodge the fruit, the front and rear stabilizing elements move in opposition to the middle displacing elements to stabilize the front and rear parts of the bush in the enclosure. This reduces the amount of fruit dislodged from the bushes forward and rearward of the harvester enclosure. As the fruit falls to the floor of the harvester enclosure, it is directed sideways to a rearwardly traveling conveyor which transports the fruit to a rear collecting station.

It is an object of the present invention to provide apparatus and methods for collecting produce from plants in a manner to obtain an improved yield of the produce at greater picking rates and to minimize damage to the plants.

BRIEF DESCRIPTION OF THE DRAWINGS

These and other objects and advantages of the present invention will become more readily apparent upon reading the following Detailed Description and upon reference to the attached Drawings in which.

Figure 1:
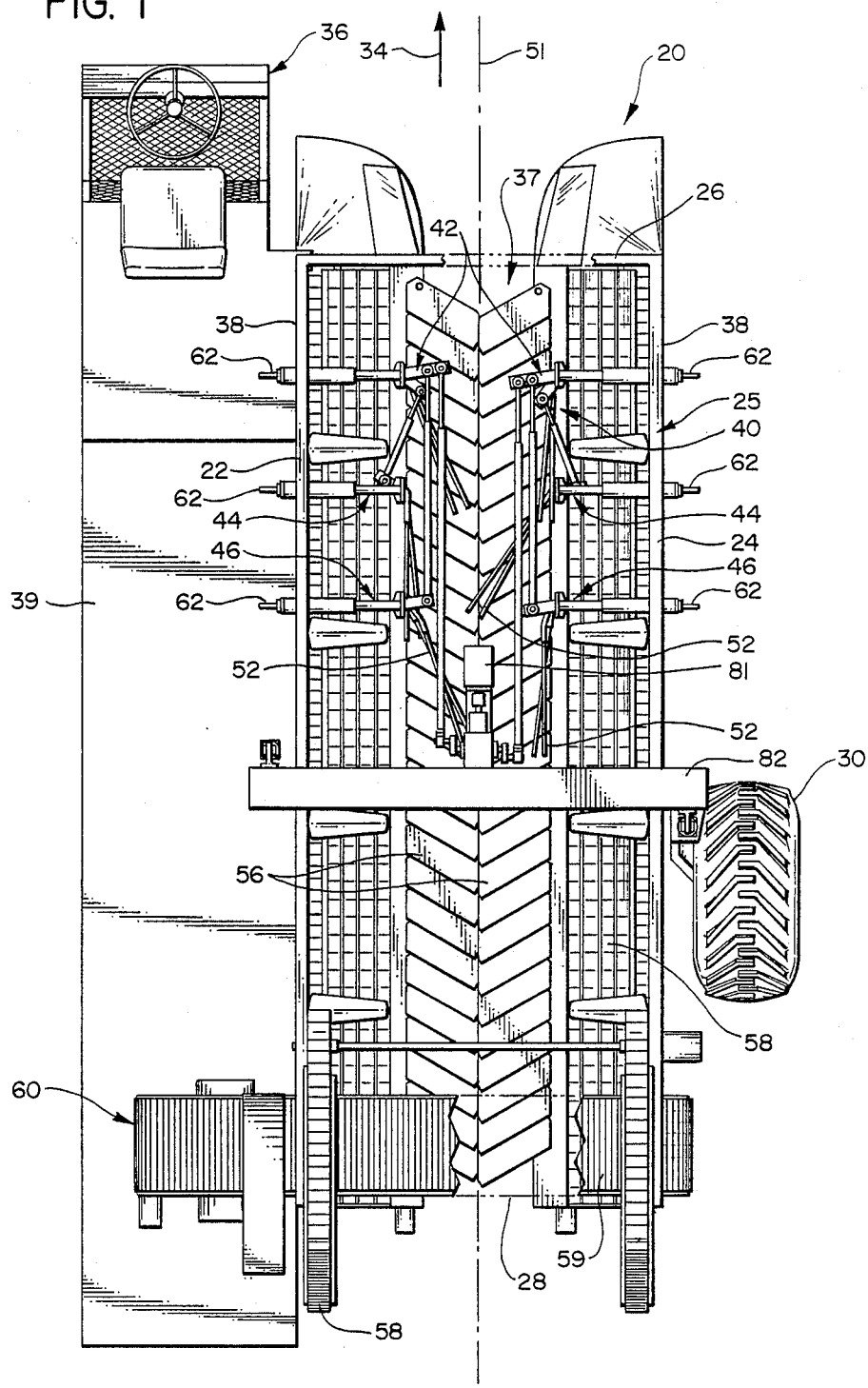
FIG. 1 is a top view of the harvesting apparatus of the present invention.
Figure 2:
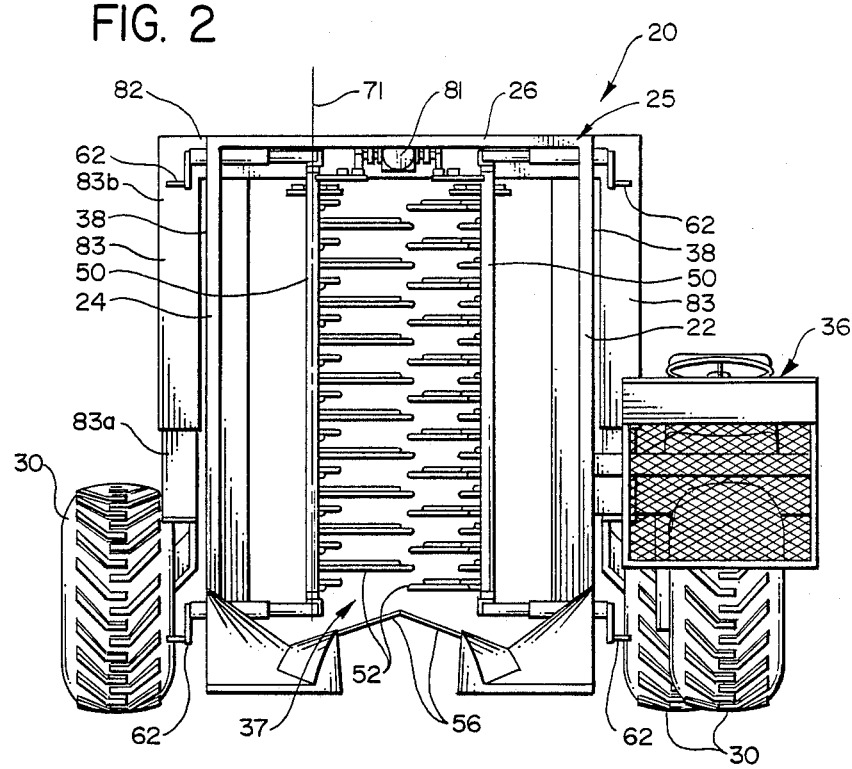
FIG. 2 is a front view of the harvesting apparatus of the present invention.
Figure 3:
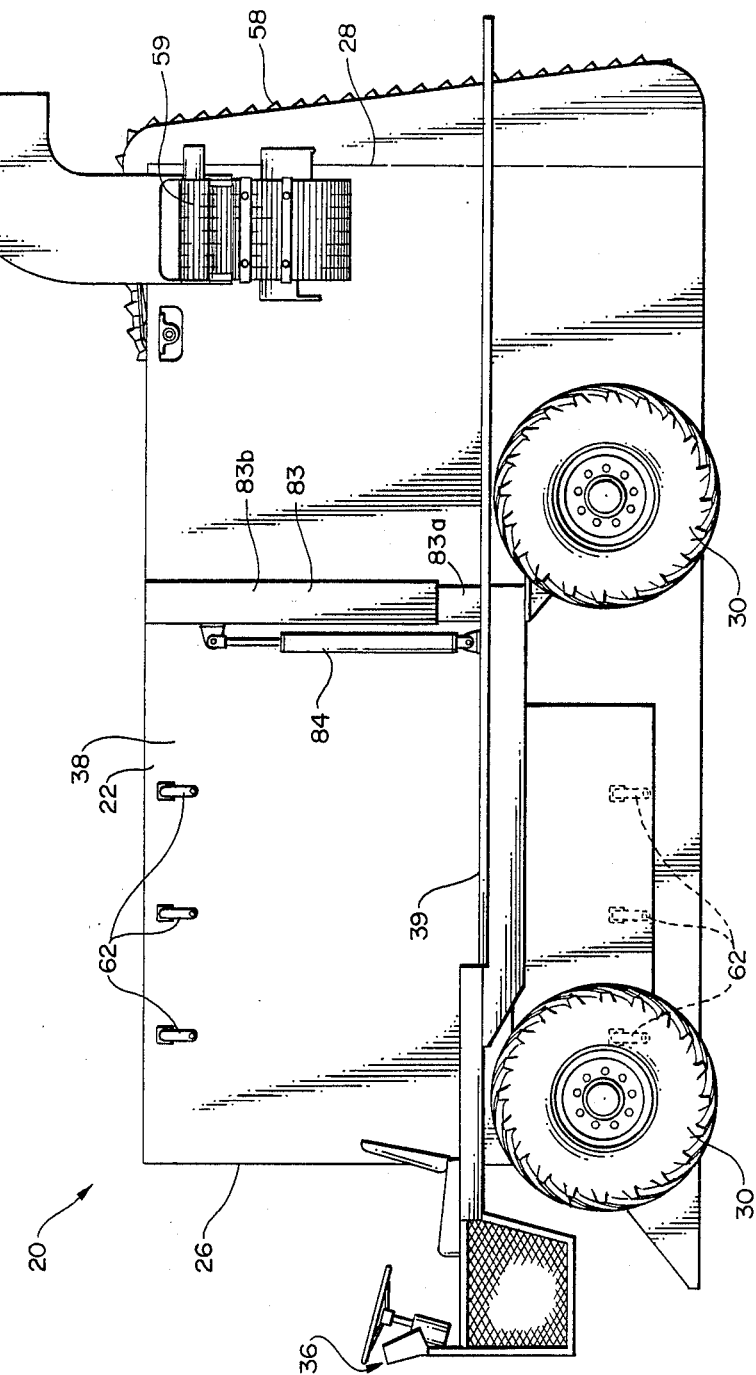
FIG. 3 is a left side view of the harvesting apparatus.
Figure 4:
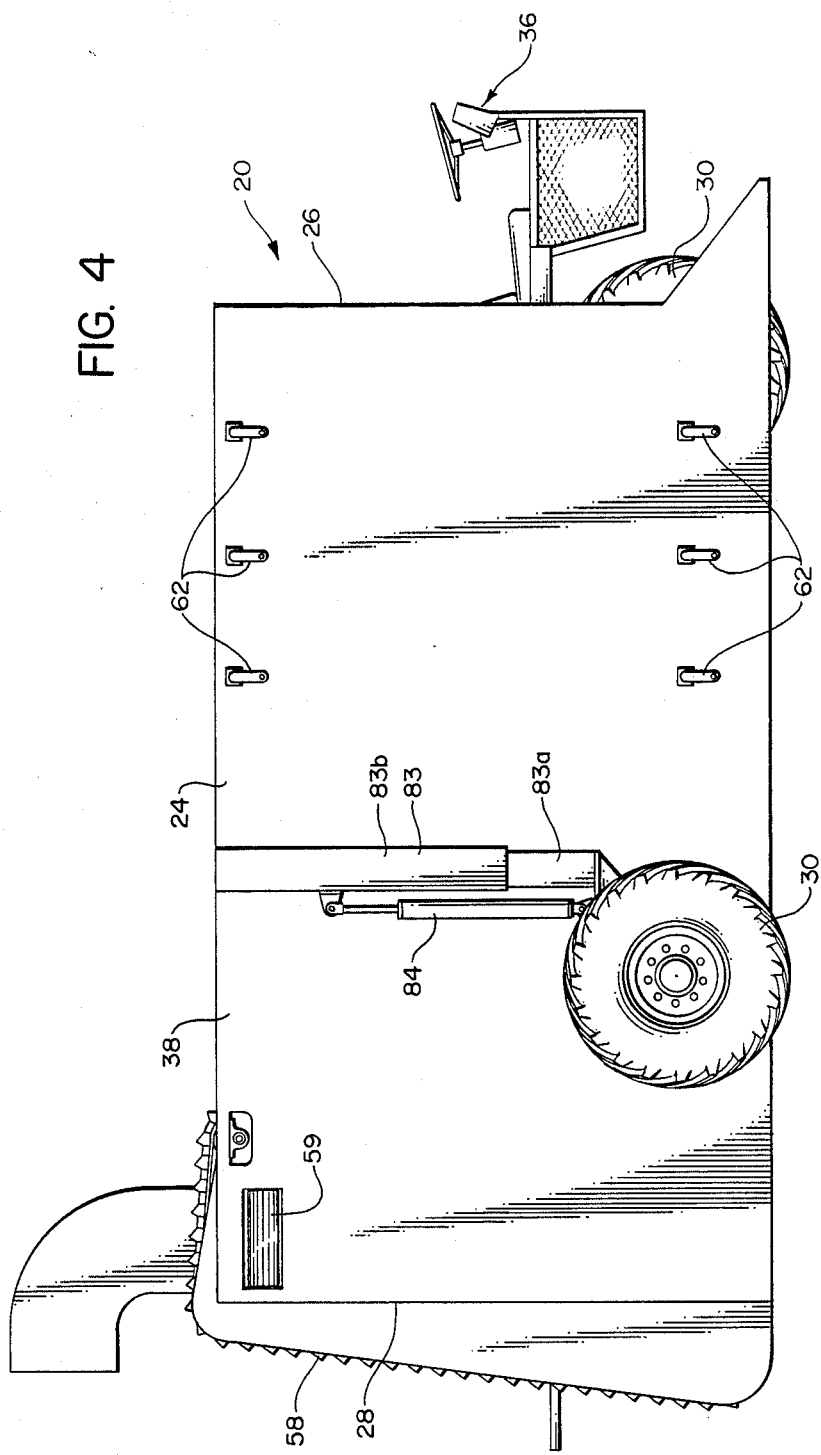
FIG. 4 is a right side view of the harvesting apparatus.

While the present invention is susceptible of various modifications and alternative form, specific embodiments thereof have been shown by way of example in the Drawings and will herein be described in detail. It should be understood, however, that it is not intended to limit the invention to the particular forms disclosed, but on the contrary, the invention is to cover all modifications, equivalents and alternatives falling within the spirit and scope of the invention as expressed in the appended claims.

DETAILED DESCRIPTION OF THE INVENTION

The present invention pertains to a machine for harvesting fruit, and in particular to a machine for harvesting berries from bushes which are commonly grown in rows, and where the berry bushes are sometimes supported between upstanding trellises or the like by a number of horizontal supporting wires which extend between the bushes from one trellis to another.

Before proceeding with a detailed discussion of the invention, the principal elements and their operation will be described first. Referring to FIGS. 1 through 4, a harvesting machine, generally indicated at 20, includes a frame having a left side 22, a right side 24, a front 26 and a rear 28. The frame is supported by wheel assemblies 30 for movement in a forward direction indicated by an arrow 34. The harvester is propelled by an internal combustion engine (not shown) in response to commands from an operator seated at the left front portion of the harvester and behind a steering wheel and control panel indicated at 36. The frame includes (i) a pair of upstanding sidewalls 38 which extend in a longitudinal fore and aft direction and which form an enclosure indicated at 37 which is open at the front 26, rear 28 and at the top, and (ii) a work station platform 39 which is mounted at the left side of the frame. In operation, the harvester is steered along a row of bushes in a manner shown in FIGS. 15 and 16, so that the bushes enter the front 26 of the harvester enclosure, and exit from the rear 28.

In order to dislodge the berries, a bush stabilizing and displacing assembly, generally indicated at 40 in FIG. 1, is located near the front of the harvester enclosure. The stabilizing and displacing assembly 40 includes front and rear stabilizing means, indicated at 42 and 46, respectively, and middle displacing means 44. It should be appreciated that the front and rear stabilizing means 42, 46 and middle displacing means 44 have somewhat similar structures, however their operation and functions differ as their names imply, in a manner to be described further hereinafter.

Each of the displacing means includes left, right vertical upstanding posts 50 (FIG. 2) which are movably mounted to the frame inward of left, right sidewalls 38, respectively, and which have flexible horizontally extending rods 52 which are rigidly mounted to the upstanding posts 50. For ease of discussion, the enclosure 25 is divided longitudinally by an imaginary centerline 51 as shown in FIG. 1, into left, right portions. Furthermore, the term "inward" refers to a transverse direction toward centerline 51 and "outward" refers to a transverse direction away from centerline 51.

As the harvester travels in the forward direction, support posts 50 are caused to rotate about their respective upstanding longitudinal axes. This in turn causes the rods 52 to move in a general side-to-side direction which has a substantial transverse alignment component and a smaller longitudinal alignment component, thereby causing the bushes inside the enclosure 37 to be swayed in a corresponding direction. This side-by-side swaying action, which is quite vigorous, dislodges the ripe berries from the bush. As the berries are dislodged, they fall downwardly onto a plurality of lower, substantially horizontal conventional collecting plates 56 which extend somewhat upwardly at their inward ends to form an inverted "V" configuration. Collecting plates are spring biased to the position shown in FIG. 1. However, when they engage the trunk of a bush, collecting plates 56 are caused to rotate rearwardly and outwardly about respective pivot connectors mounted to their inward ends to allow the trunk to proceed through enclosure 37. Upon landing on the collecting plates, the berries to travel outwardly and downwardly into left, right fore-and-aft travelling endless conveyors 58 which carry the berries to the rear of the harvester and then upwardly where they are unloaded onto a rear conveyor 59 which operates in a transverse direction and which transports the berries to a collecting station indicated at 60 where the berries are unloaded.

It is a feature of the present invention to overcome the deficiencies of conventional harvesters, some of which are described in the Background of the Invention. To this end, the harvester of the present invention is adapted to variably position the stabilizing and displacing assembly 40 in a manner that the rods 52 "hug" the bush throughout their side-to-side movement. Therefore, instead of slapping or impacting the bush as in conventional apparatus, the rods 52 remain substantially in contact with the bush throughout their operational cycle. This is achieved by moving the upstanding support posts 50 transversely within the enclosure and into close engagement with the bushes by means of hand cranks 62 which are located on the outer sides of the sidewalls 38.

A further feature of the present invention is the operation of the bush stabilizing and displacing assembly 40 in a manner that (i) the stabilizing rods 52 of the front and rear stabilizing means 42, 46 operate to stabilize the bush, and (ii) the displacing rods 52 of the middle displacing means 44 operate to primarily achieve the aforementioned side-to-side displacing movement of the bush. This stabilizing effect is achieved in part by the side-to-side movement of the front and rear stabilizing rods 52 through a smaller arcuate path than that of middle displacing rods 44. In addition, while the stabilizing rods 52 of the front and rear stabilizing means 42, 46 operate together in phase, the displacing rods 52 of the middle displacing means 44 operate 180° out of phase with the front and rear displacing rods. Thus, while the bush travels rearward through the enclosure of the harvester, the middle portion of the bush is subjected to substantial side-to-side dislodging movement by the middle displacing means 44, while the front and rear portions of the bush within the enclosure are inhibited from any substantial side-to-side movement. By the opposing action of the front and rear stabilizing means, the number of berries which are dislodged from the bushes both forward and rearward of the harvester enclosure due to the aforementioned "telegraphing action" is reduced.

Figure 5:
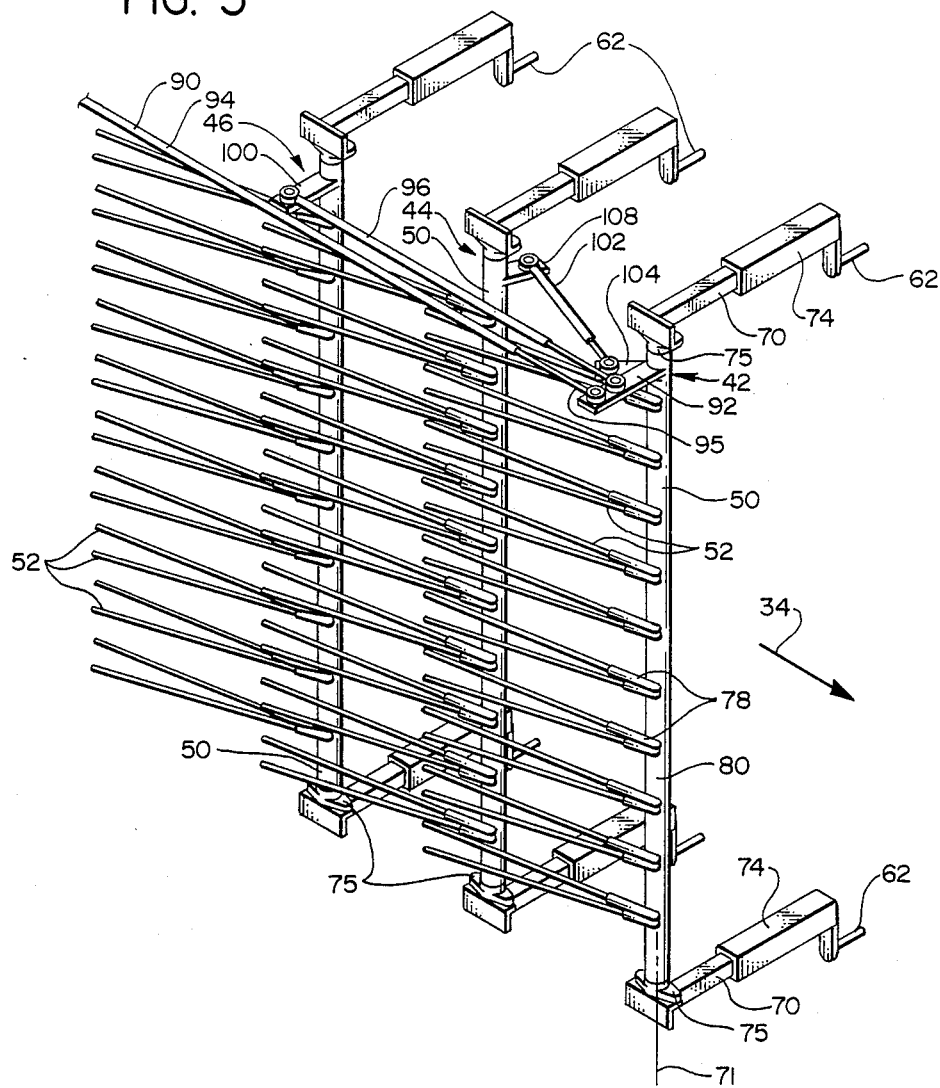
FIG. 5 is an isometric view of the left portion of the stabilizing and displacing assembly which is connected to the left side of the harvesting apparatus.

Having described the principal elements of the present invention and their operation, these elements and the remaining elements of the harvester 20 will be described in greater detail. Shown more clearly in FIG. 5 are the left front, and left rear stabilizing means 42 and 46, and the left middle displacing means 44. It should be appreciated that the left side of the stabilizing and displacing assembly 40 is identical to the right side, which is not shown in FIG. 5 for clarity. In FIG. 5, each upstanding support post 50 is pivotally mounted at its top and bottom to upper, lower transversely extending horizontal sleeves 70, for pivotal movement about respective upstanding rotational axes designated by a line 71. To achieve optimum displacing and stabilizing operation, each of the upper, lower sleeves 70 is slidably engaged within an outer housing 74 which in turn is rigidly mounted to and extends through a respective sidewall 38 at the upper and lower portions of the sidewall. Transverse movement of sleeve 70 within the housing 74, is achieved by the manual operation of the corresponding handcrank 62 which is rotatably mounted to the housing 74 outside of the harvester enclosure. The handcrank 62 is rigidly connected to a threaded screw, such as an Acme threaded screw. The Acme screw extends within housing 74 and threadably engages a female threaded portion of sleeve 70 in a manner that rotation of the Acme screw within the sleeve 70 causes axial movement of the sleeve 70 on the screw transversely within the harvester enclosure. To support the upstanding support posts 50 for rotational movement on the sleeves 70, the inward ends of the sleeves include brackets 75 having cylindrical vertical slots (not shown) which receive the upper, lower ends of the posts 50 therein for rotation about axes 71.

In order to closely engage the berry bush as it travels through the harvester enclosure 37, the rods 52 (FIG. 5) are rigidly mounted at their inner proximal ends to the support posts 50 by means of horizontal holder tubes 78 which in turn are rigidly mounted to the inward surfaces 80 of the upstanding support posts 50. Efficient displacing and stabilizing action is achieved by mounting the rods 52 in pairs between the upper and lower portions of the support posts 50 in a manner that each paired set of rods 52 extend somewhat horizontally from the support posts 50. In order to improve displacing and stabilizing action, the rods 52 of each paired set diverge horizontally from posts 50 by several degrees.

The displacing and stabilizing assembly 40 (FIG. 1) is driven by means of a hydraulic motor 81 which is rigidly mounted to a transversely extending cross member 82 by means of a forwardly extending support bar (not shown). Cross member 82 is supported above the upper edges of sidewalls 38 by means of downwardly depending support struts 83 (FIG. 2) which are connected to the sidewalls 38, and which include inner and outer axial sleeve portions 83a, 83b, respectively. The inner support struts 83a in turn are connected to the rear wheel assemblies 30. To allow the harvesting enclosure 37 to be raised and lowered relative to the ground, conventional hydraulically actuated left, right piston/cylinder assemblies 84 (FIGS. 4 and 5) are connected to the strut outer sleeve portions 83b and to the wheel assemblies 30.

Figure 6:
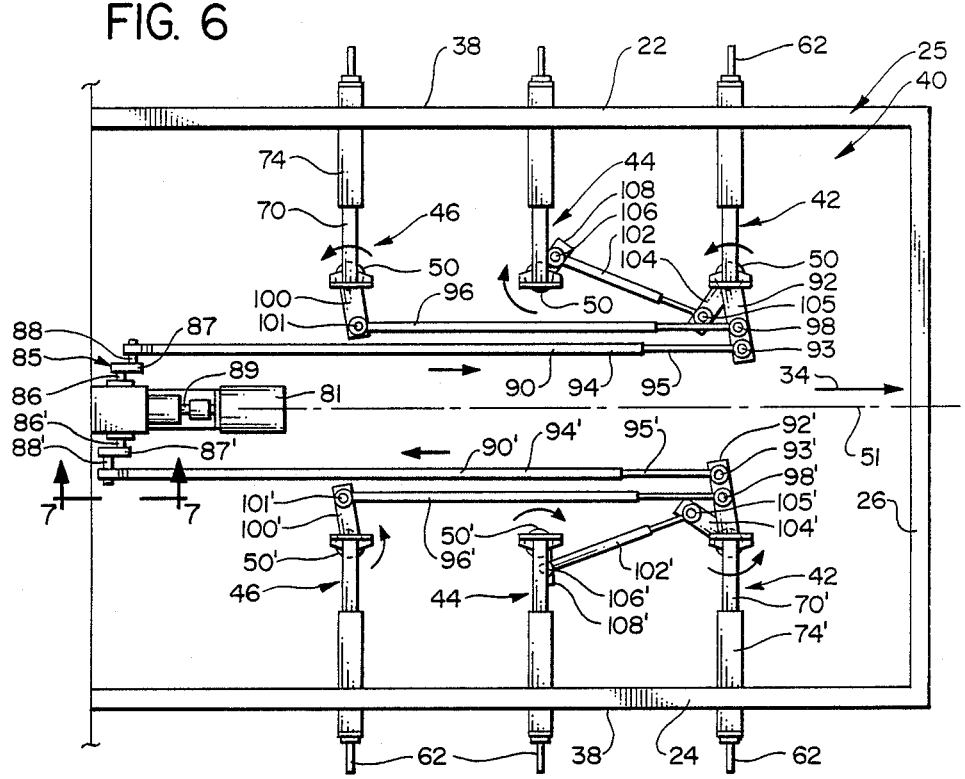
FIG. 6 is a top view of the stabilizing and displacing assembly drive mechanism in a first drive position.

As shown more clearly in FIG. 6, the stabilizing and displacing assembly drive motor 81 is operatively connected to a transversely extending crank shaft, indicated at 85, by means of drive shaft 89. For clarity in discussing the displacing and stabilizing assembly 40, the corresponding elements on the right side of the enclosure will be designated by like numerals with a prime (') symbol attached. The crank shaft 85 includes left and right inward shaft portions 86, 86', respectively, which in turn are rigidly connected to the left and right end plates 87, 87' at eccentric locations on the end plates 86. In turn, each end plate 87 includes an outer eccentrically mounted transversely extending shaft portion 88 to which a fore-and-aft extending primary drive rod 90 is journalled. In order to achieve a reciprocating drive motion, the left outer shaft portion 88 is eccentrically mounted to the left end plate 87 in a manner 180° from the position which the right shaft portion 88' is mounted to the right end plate 87'. Thus, during rotation of crank shaft 85, when the left primary drive rod 90 is moved in a forward direction, the right primary drive rod 90' is moved in a rearward direction.

Pivotal movement of the forward support posts 50 about axes 71 and the side-to-side movement of the stabilizing rods 52 therewith is achieved by connection of the respective primary drive rods 90 to the inward ends of respective elongated transverse extension bars 92 by a pivot connector 93. Extension bars 92 in turn are rigidly connected to and extend inwardly from the upper and lower ends of the forward support posts 50. In order to adjust the rotational path of the rods 52 by varying the length of the primary drive rods 90, each drive rod 90 includes an outer sleeve portion 94 and an inner sleeve portion 95 which is axially slidably engaged within the outer sleeve portion 94. The position of each inner sleeve portion 95 relative to the outer sleeve portion 94 is fixed by a releasable fastener (not shown). Thus, lengthening of the left primary drive rod 90 causes the left forward support post 50 to be adjusted in a counterclockwise direction (when viewing FIG. 6), so that the path of the left front stabilizing rods 52 are moved somewhat inward. Likewise, decreasing the length of the left primary drive rod 90, causes the left support post 50 to be adjusted in a clockwise manner so that the path of the left forward stabilizing rods 52 are adjusted somewhat outward.

As mentioned previously, the stabilizing rods 52 of the front and rear stabilizing means 42, 46, rotate together in phase. That is, the longitudinal axes of the stabilizing rods 52 of the forward, rear stabilizing means 42, 46 remain substantially parallel throughout their pivotal movement about axes 71. This is achieved by left, right axially adjustable secondary drive rods 96 (FIG. 6) which are pivotally connected (i) at their forward ends to the left, right first extension bars 92, 92' by respective pivot connectors 98 which are located just outward from centerline 51 from the pivot connectors 93, and (ii) at their rearward ends by pivot connectors 101 to left, right third elongated extension bars 100, 100' which are rigidly mounted to the top of the left, right rear support posts 50, 50' in a manner that the third extension bars 100 are generally parallel to the first extension bars 92.

In order to achieve efficient displacing action of the bushes, the support posts 50 of the middle displacing means 44 are rotated through a greater arc than are the support posts 50 of the front, rear stabilizing means 42, 46. In a preferred embodiment, the stabilizing rods 52 of the front and rear stabilizing means 42, 46 travel through an arc of approximately 20° while the displacing rods 52 travel through an arc of approximately 29°. This is accomplished by left, right axially adjustable tertiary drive rods 102, 102' which include forward end portions which are connected by pivot connectors 105, 105' to left, right fourth extension bars 104, 104' which extend inwardly and rearwardly from support posts 50 of the front stabilizing means 42. The left, right extension bars 104, 104' are rigidly mounted to the forward left, right support posts 50 in a manner that the longitudinal axis of each extension bar 104 forms an angle of approximately 45° with the longitudinal axis of the first extension bar 92. The rear ends of the left, right tertiary drive rods 102 are connected by pivot connectors 106 to left, right fifth extension bars 108, 108' which extend from the upper portion of the support post 50 of the middle displacing means 44. The left fifth extension bar 108 extends primarily outward and somewhat forward from left middle support post 108, whereas the right extension bar 108' extends generally outward from the right middle post 50.

This arrangement generates a displacing and stabilizing action which is shown more clearly by referring to FIGS. 6 through 14. First, reference is made to FIGS. 6, 7 and 8, where the right outer shaft portion 88' of crank shaft 85 extends rearwardly at the nine o'clock position (FIG. 7) and the left outer shaft portion 88 extends forwardly at the three o'clock position. This places the left front and rear upstanding support posts 50 at positions of maximum counterclockwise rotational travel, and the left front and rear stabilizing and displacing rods 52 so that they have moved in a rightward direction to a location where they extend primarily rearward and somewhat inward at about the eight o'clock position in FIG. 8. In addition, the right front and rear support posts 50 are at positions of maximum counterclockwise travel, with the right front and rear stabilizing rods 52 having moved rightward to a position where they extend primarily rearward.

The desired stabilization of the forward and rearward portions of the berry bush during side-to-side movement of the middle portion is achieved by the in phase movement of front, rear stabilizing rods 52 in a parallel manner. Thus, as can be seen by referring to FIGS. 8, 11 and 14, the aforementioned pivotal rotation of the left and right front support posts 50 and displacing rods 52, causes substantially identical pivotal rotation of the left and right support posts 50 and displacing rods 52 of the rear stabilizing means 46. This is due to the fact that the front and rear support posts 50 are linked by secondary drive rods 96 and by the fact that the front pivot connectors 98 and rear pivot connectors 101 are located at equal distances from the upstanding rotational axes 71 of the front and rear support posts 50.

Figure 7:
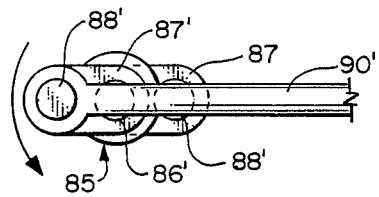
FIG. 7 is a side view of a portion of the drive mechanism in the first drive position including primary drive rods which are eccentrically mounted to a motor driven crank shaft.
Figure 8:
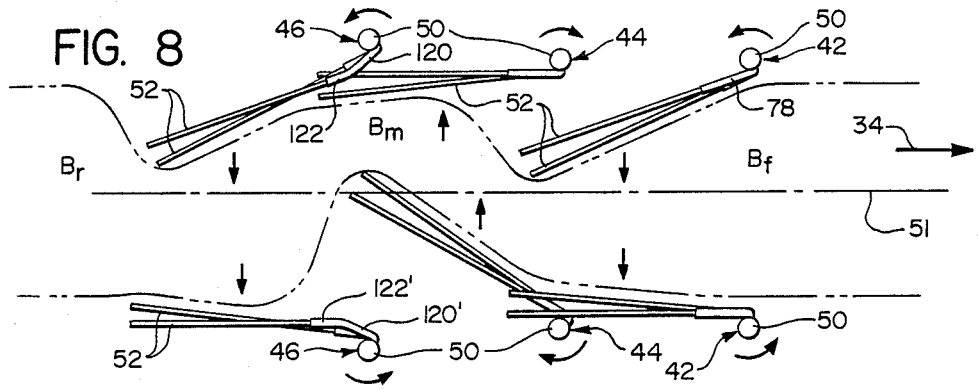
FIG. 8 is a top view of the stabilizing and displacing rods in the first position in solid lines and an outline of the position of the harvested bush in phantom.

In the first position shown in FIGS. 6 through 8, the left support post 50 of the middle displacing means 44 is at a location of maximum clockwise rotation. This positions the left displacing rods 52 so that they have moved in a left direction and they extend rearward in a manner generally parallel to centerline 51 at about the nine o'clock position. In addition, the right middle support post 50 of the displacing means 44 has reached its position of maximum clockwise travel. This positions the right displacing rods 52 so that they have moved leftward to a position where they extend inward and rearward between about the ten to eleven o'clock position. As a result of the leftward movement of the middle displacing rods 52, a corresponding leftward movement is transmitted to the middle portion $B_m$ of the bush as shown in FIG. 8. However, to stabilize the forward portion $B_f$ of the bush, the left stabilizing rods 52 of the forward displacing means 42 engage the left side of the bush and move it rightward in opposition to the leftward movement of the right middle displacing rods. In the first position shown in FIG. 8, an imaginary extension of the left forward stabilizing rods 52 intersects the right displacing rods 52 at an angle of about 70°. To engage the right side of the bush forward portion $B_f$ and to prevent movement of the bush forward portion in the rightward direction so as to prevent the bush from forming an "S" configuration, the right front stabilizing rods 52 do not pivot past a location where they are generally parallel to centerline 51. Therefore, while the left front stabilizing rods 52 are exerting an inward force against the left side of the bush forward portion $B_f$ in a rightward direction inside the enclosure, the right front stabilizer rods 52 are restraining the right side of the bush forward portion $B_f$ from moving to the right side of the enclosure 37. This essentially stabilizes the bush forward portion $B_f$ about centerline 51. Similarly, the left stabilizing rods of the rear stabilizing means 46 move rightward within the enclosure in opposition to the aforementioned leftward movement of the bush middle portion $B_m$ and in a manner parallel to the front displacing rods 52. This helps to stabilize the rear portion $B_r$ of the berry bush before it exits from the rear of the harvester enclosure 37. Furthermore, the right rear stabilizing rods 52 extend in a primarily rearward and slightly inward direction to restrain the right side of the bush rear portion $B_r$ from moving to the right side of enclosure 37.

Figure 9:
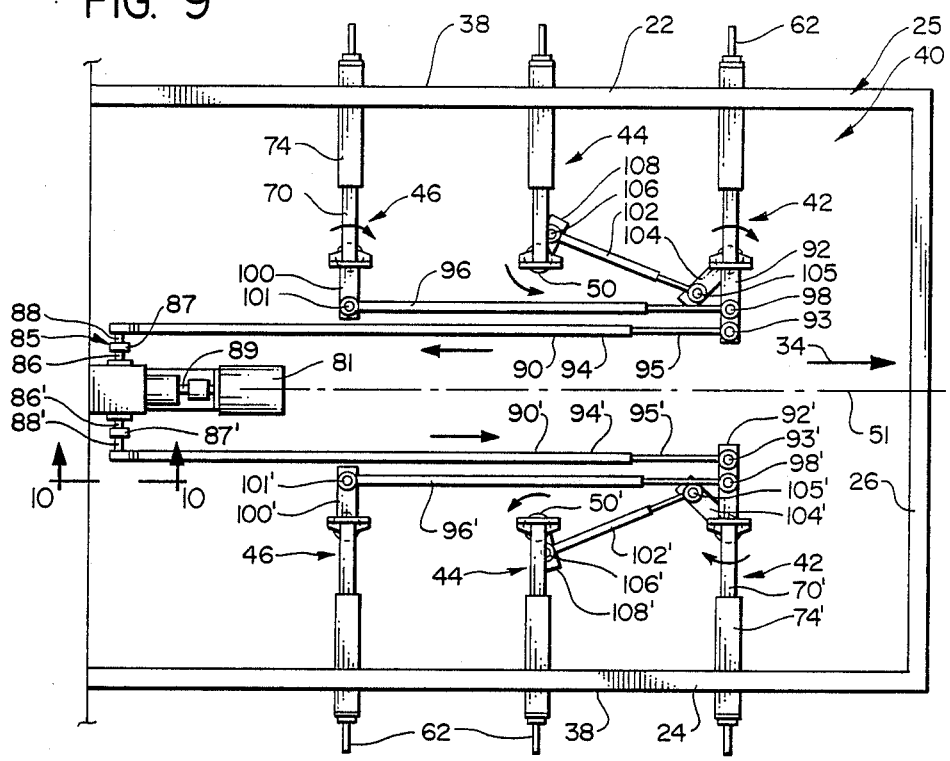
FIG. 9 is a top view of the assembly drive mechanism in a second drive position.
Figure 10:
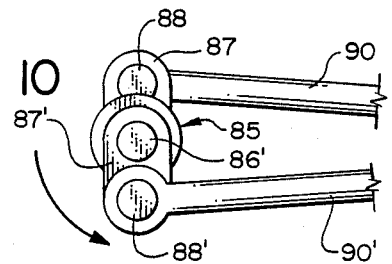
FIG. 10 is a side view, similar to FIG. 7, of a portion of the drive mechanism in the second position.
Figure 11:
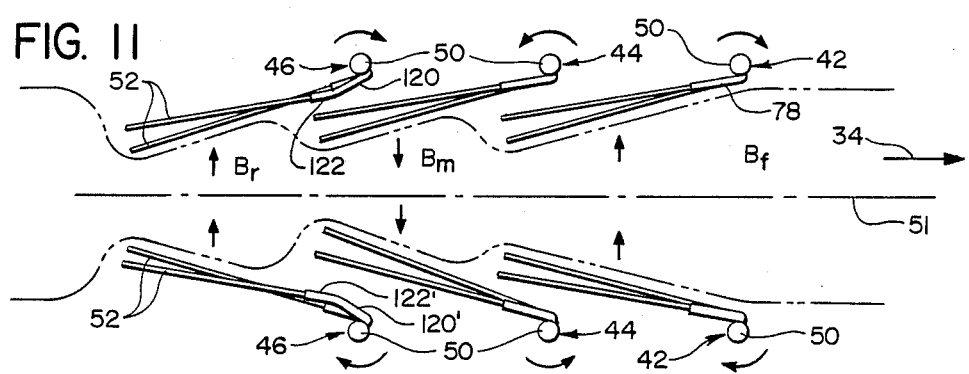
FIG. 11 is a top view of the stabilizing and displacing rods in the second position.

Continuing with a discussion of the operation of the displacing and stabilizing assembly 40, reference is made to FIGS. 9 through 11 were crank shaft 85 has rotated in a counterclockwise direction approximately 90° from its position shown in FIG. 7. In this second position, the left, right outer shaft portions 88, 88', extend upward and downward in the twelve o'clock and six o'clock positions, respectively. This in turn causes forward movement of the right primary drive rod 90, clockwise rotation of the right front support post 50 and left inward movement of the right stabilizer rods 52 of the forward stabilizing means 42. Likewise, rearward movement of the left primary drive rod 90 causes clockwise rotation of the left forward support post 50 and left outward movement of the left forward stabilizing rods 52. In the second position, the tips of the left, right stabilizing rods of the front stabilizing means 42 are generally equally spaced from centerline 51. Furthermore, the left, right secondary drive rods 96 cause the left, right stabilizing rods 52 of the rear stabilizing means 46 to move in a parallel manner to the left, right stabilizing rods 52, respectively, of the forward stabilizing means 42.

On the other hand, the aforementioned clockwise rotation of the left front support post 50 in turn causes a generally rearward and somewhat outward axial movement of the left tertiary drive rod 102 and counterclockwise rotation of the left middle support post 50. This in turn causes right inward movement of the left middle displacing rods 52 to a location where they are generally parallel to the left stabilizing rods 52 of the front and rear stabilizing means 42, 46 (FIG. 11). Movement of the right displacing rods 52 of the middle displacing means 44 in a right outward direction to a location where the middle displacing rods are parallel to the stabilizing rods 52 of the front and rear displacing means 42, 46, is achieved by means of the generally forward and somewhat inward axial movement of the right tertiary drive rod 102' so that right middle support post 50' is rotated in the clockwise direction. The aforementioned movement of the stabilizing and displacing rods 52, places the bush in a transition state where the middle portion $B_m$ of the bush is generally aligned with the front and rear portions.

Figure 12:
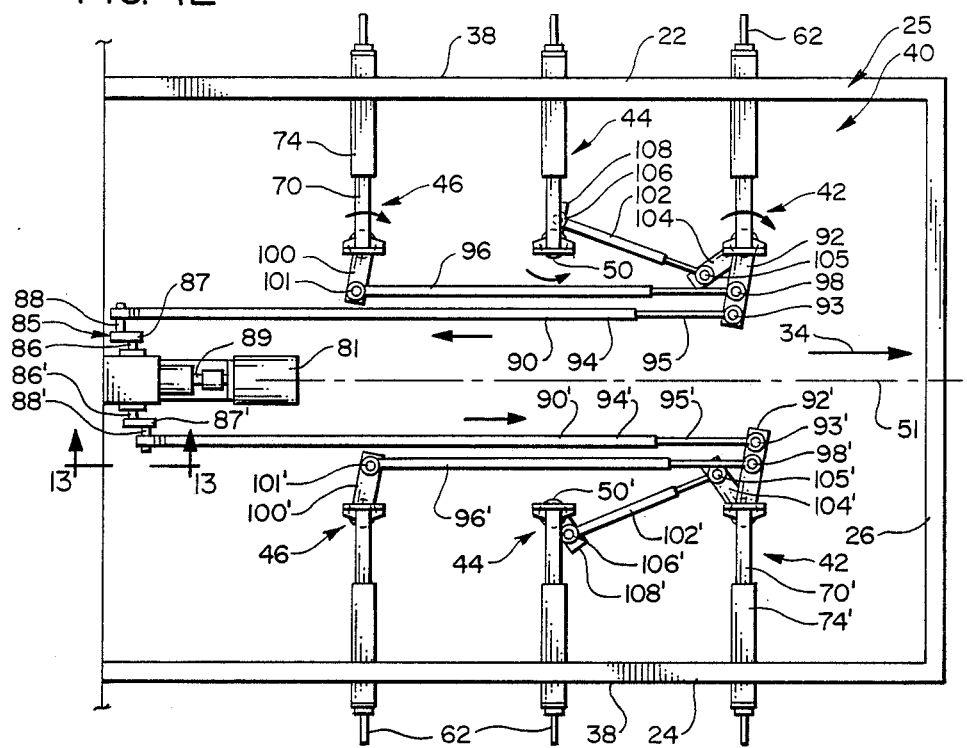
FIG. 12 is a top view of the assembly drive mechanism in a third position.
Figure 13:
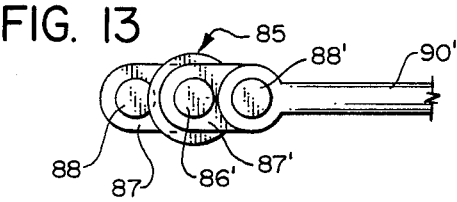
FIG. 13 is a side view, similar to FIGS. 7 and 10, showing a portion of the drive mechanism in the third position.
Figure 14:
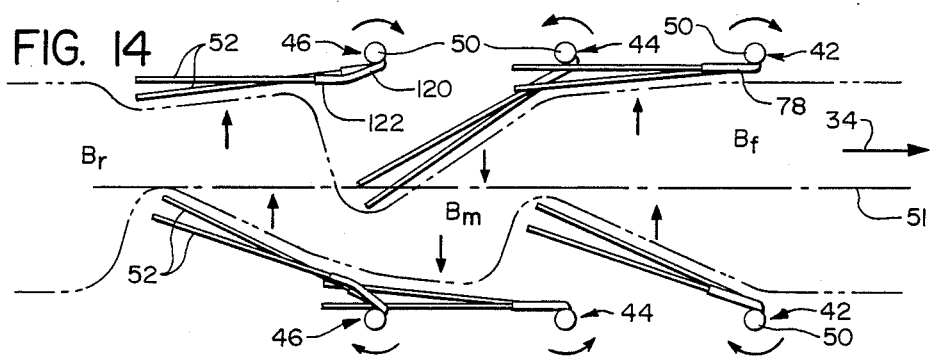
FIG. 14 is a top view of the stabilizing and displacing rods in the third position.

However, further 90° counterclockwise rotation of crank shaft 85 places the displacing and stabilizing assembly 40 in the third position shown in FIGS. 12 through 14. In this position, the right outer shaft portion 88' has moved forwardly to a three o'clock position shown in FIG. 13, and the left outer shaft portion 88 is moved rearwardly to a nine o'clock position. This causes the forward movement of the right primary drive rod 90' and clockwise rotation of the right front support post 50', as well as rearward movement of the left primary drive rod 90 and clockwise rotation of the left front support post 50. The aforementioned clockwise rotation of the left and right front support posts 50 causes (i) the left stabilizing rods 52 of the forward and rearward stabilizing means 42, 46 to rotate in a left outward direction to positions where they extend generally rearward, and (ii) the right stabilizing rods 52' of the forward and rearward stabilizing means 42, 46 to rotate in a left inward direction to the positions where they extend generally rearward and inward between about the ten o'clock and eleven o'clock positions.

At the same time, the clockwise rotation of the left forward support post 50 causes a generally rearward and somewhat outward axial movement of the left tertiary drive rod 102 which in turn causes counterclockwise rotation of the left middle support post 50 and right inward movement of the left displacing rods 52. Likewise, the clockwise rotation of the right front support post 50 causes counterclockwise rotation of the right middle support post 50 by means of the forward and somewhat inward axial movement of the right tertiary drive rod 102, and right outward movement of the right displacing rods 52 to a position where the right middle displacing rods 52 extend rearward in a manner generally parallel to centerline 51. The aforementioned motion of the middle displacing rods and stabilizing rods causes a rightward sideways movement of the middle portion $B_m$ of the berry bush, while the front $B_f$ and rear $B_r$ portions of the berry bush are stabilized by the opposing movement of the stabilizing rods of the front and rear stabilizing means 42, 46 in a manner described previously.

Further counterclockwise 90° rotation of the crankshaft 85 returns the displacing and stabilizing assembly 40 to the first position shown in FIGS. 6 through 8. It should be appreciated that during movement of the displacing and stabilizing assembly 40 through the first, second and third positions and around again to the first position, the middle portion $B_m$ of the berry bush within enclosure 37 is moved from side-to-side by the middle displacing rods 52, while the front and rear portions of the bush are stabilized by the front and rear stabilizing rods 52. This not only reduces the side-to-side movement of the berry bush forward and rearward of the harvester enclosure 37, but it also imparts an improved dislodging action to the middle portion $B_m$ of the bush by the side-to-side movement of the displacing rods 52. This is due to the fact that the side-to-side movement of the middle portion $B_m$ of the bush is more abrupt when its forward and rearward ends are being stabilized and are not permitted to move with the middle portion. Thus, in contrast to conventional harvesters which "beat" or "slap" at the bushes to dislodge the berries, the displacing and stabilizing rods of the harvester of the present invention holds the bush snugly but gives it an abrupt side-to-side shaking action.

In a preferred embodiment, the front and rearward stabilizing rods 52 travel through a smaller arc than do the middle displacing rods 52. This is due to the fact that the front and rear rods are primarily stabilizers, whereas the middle rods must ensure a sufficient side-to-side motion of the bushes to cause the ripe berries to be dislodged. To cause the middle displacing rods 52 to travel through a greater arcuate path, pivot connectors 105, 105' (FIG. 6) of the forward ends of tertiary drive rods 102, 102' are located radially outward from the upstanding rotational axes 71 of the front support posts 50, 50' at a greater distance than are pivot connectors 106, 106' from the upstanding rotational axes 71 of the middle support posts 50. Thus, the rotation of front posts 50 causes the middle posts 50 to rotate through a greater arc than do the front posts. The rotational arc of the middle posts relative to the forward posts is made adjustable by a number of vertical openings (not shown) located longitudinally along the extension bars 104, 108 and which are adapted to engage the pivot connectors 105, 106 therein.

Figure 15:
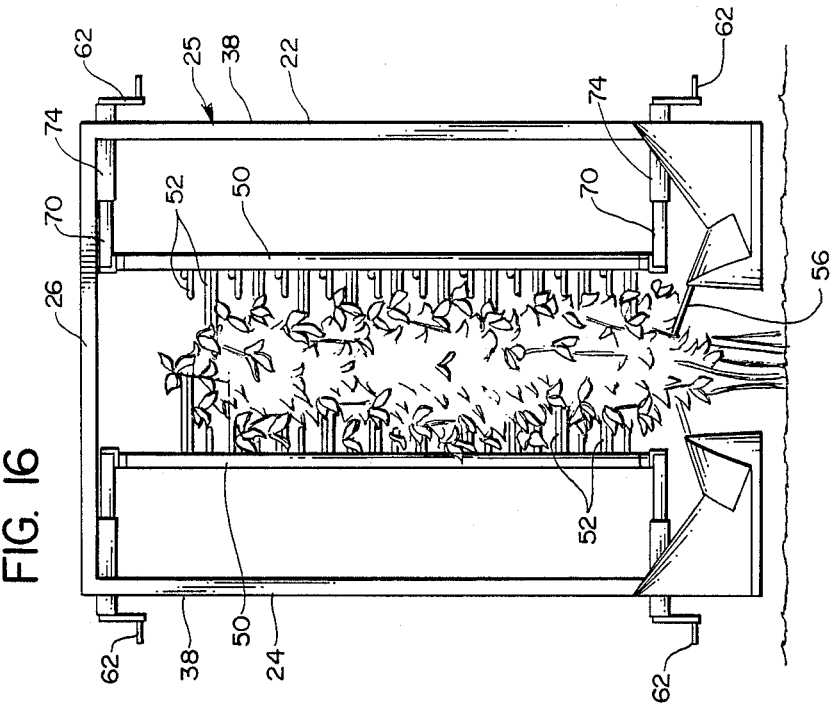
FIG. 15 is a front view of the harvesting apparatus and showing a selected transverse separation of the support posts and the stabilizing and displacing rods early in a harvesting season when the berry bushes have a wider diameter.
Figure 16:
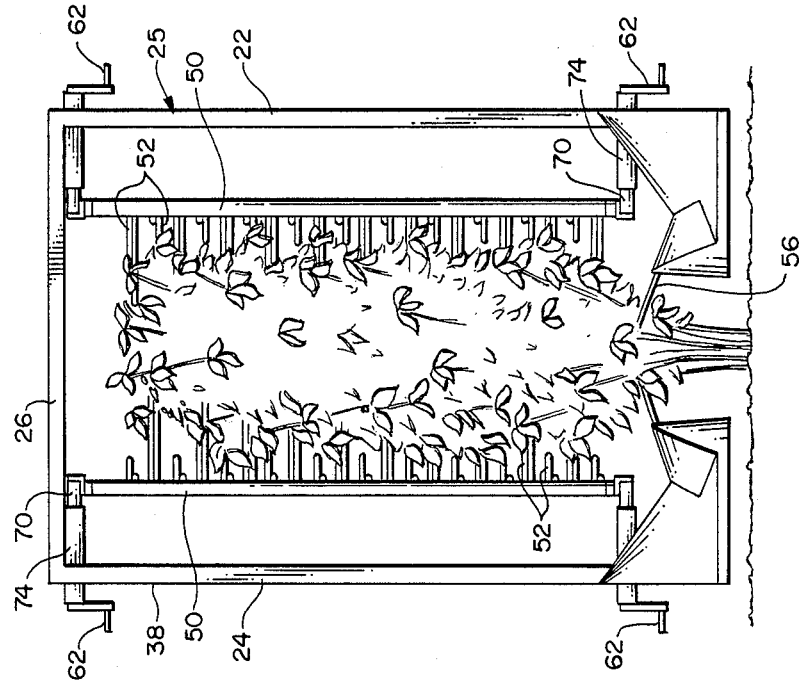
FIG. 16 is a front view, similar to FIG. 15, and showing the support posts and rods in a selected closer relationship to engage a berry bush later in the harvesting season.

As mentioned previously, the support posts 50 are pivotally mounted to the upper, lower laterally extending sleeves 70 as shown in FIGS. 15 and 16. It has been found that during a harvesting season, the width of a typical berry bush tends to decrease in accordance with the number of times the bush has been picked because the bush is compacted somewhat by the stabilizing and displacing assembly 40. In order to maintain the displacing and stabilizing rods in close engagement with the berry bush throughout its side-to-side movement, the support posts 50 are adjustable slidably inward and outward by the upper, lower manual handcranks 62. In the present invention, this transverse repositioning of the support posts 50 has little effect upon either the predetermined arc of rotation of the support posts 50 and displacing and stabilizing rods 52, or upon the angular positions of the stabilizing and displacing rods 52 discussed previously herein. This ability to transversely adjust the positions of the displacing and stabilizing assembly 40 without affecting the rotational path or angular positions of the support posts and rods is achieved by the fact that, unlike conventional beater assembly drive mechanisms, in the harvester of the present invention the left and right sides of the displacing and stabilizing assembly 40 are not cross-connected. That is, in the harvester 20, the only common connection of the left and right portions of the stabilizing and displacing assembly 40, is at the crank shaft 85 (FIG. 6). Thus, for example, when the left and right support posts 50 are adjusted inwardly to accommodate a narrower row of bushes, and in a manner the the supports posts 50 on each side remain in-line at equal distances from centerline 51, there is no need to readjust the drive linkages to maintain the desired arc of oscillation of the support posts 50 and the relative angular positions of the displacing and stabilizing rods 52.

In order to permit transverse movement of the left and right sides of the displacing and stabilizing assembly 40, the rear ends of the primary drive rods 90 (FIG. 6) are coupled to the outer shaft portions 88 of the crank shaft 85 by means of conventional self aligning pillow block bearings (not shown). The pillow block bearings not only permit rotation of the primary drive rod 90 about crank shaft 85, they also permit a small amount of transverse movement of the forward ends of the primary drive rods 90. This permits the forward ends of the primary drive rods 90 to move somewhat transversely inwardly or outwardly when the left and right portions of the displacing and stabilizing assembly 40 are moved by the handcrank 62.

Figure 17:
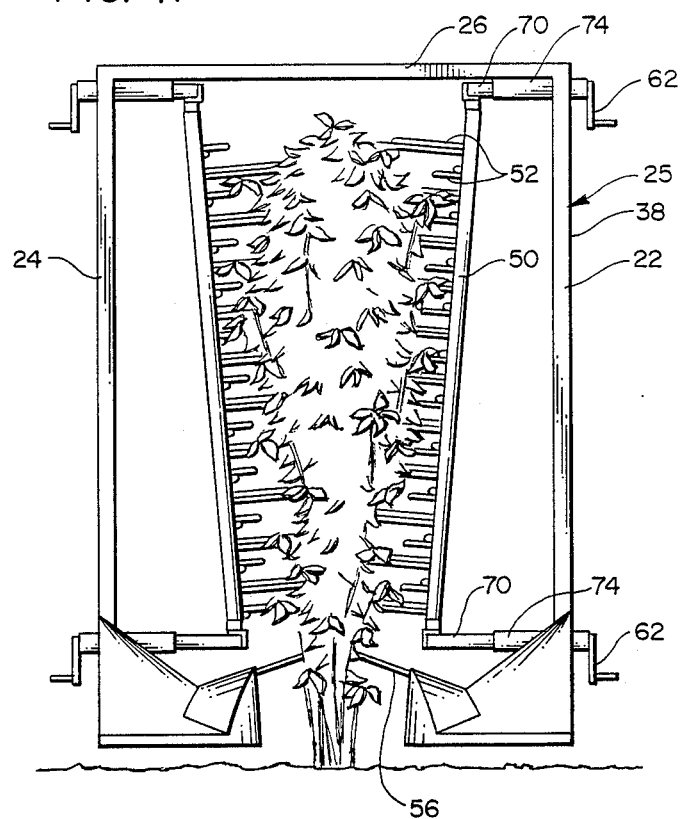
FIG. 17 is a front view similar to FIGS. 15 and 16, and showing the bottom portions of the left and right support posts and the stabilizing and displacing rods at a selected closer transverse distance than the top portions to accommodate a berry bush having a greater top diameter than bottom diameter.

In carrying out the present invention, berry bushes having different widths either at the top or at the bottom are accommodated by top and bottom ends of the support posts 50 being independently adjustable by the handcrank 62. For example, in the event the width of the bottom of the bush is less than the width at the top of the bush, as shown in FIG. 17, the lower ends of the support posts 50 may be adjusted inwardly relative to the upper ends of the supports posts by the handcranks 62.

In another exemplary embodiment of the present invention shown more clearly in FIGS. 5 and 8, the flexible displacing and stabilizing rods 52 are mounted to the support posts 50 by means of the rigid elongated holder tubes 78. The holders 78 are mounted to the inward sides 80 (FIG. 5) of the support posts 50 so that the entire length of the rods 52 remain closely engaged to the bush. By remaining in close engagement with the bush during its side-to-side movement, any "slapping" action against the bush is eliminated and impact damage to the bush in reduced. This "slapping" action occurs in conventional harvesters when the beater elements move from a first position spaced away from the bush to a second location in engagement with the bush.

Another feature of the rear holders 118 of the present exemplary embodiment is their configuration which allows the middle displacing rods to pivot to a position which is generally parallel to centerline 51 when at their maximum outward location as shown in FIGS. 8 and 14. This is permitted by the fact that the holders 78 of the rear stabilizing means 46 have a somewhat bended configuration so that their inner end portions 120 (FIG. 8) extend primarily rearward and somewhat inward, while their outer end portions 122 extend rearward. This configuration allows the rear support posts 50 to be positioned transversely outward relative to the positions of the middle support posts 50 while maintaining the positions of the rear stabilizing rods 52 relative to the front and middle rods 52. Thus, the outward positions of the rear support posts 50 allow the middle displacing rods 50 to move outwardly to a position where they are parallel to centerline 51 and without interference from the rear support posts 50.

What is claimed is:

1. Apparatus for harvesting produce, such as berries, from a row of upstanding crops having first and second longitudinally extending sides, said apparatus comprising:
   a. a movable frame including an upstanding enclosure portion which has a forward opening and a rearward opening and which has a longitudinal axis which extends between said forward opening and said rearward opening, and a transverse axis, said enclosure portion being adapted to receive a portion of said crop row therein, said crop row portion including a forward part, middle part and rearward part;
   b. crop dislodging means which are operatively connected to said frame inside said enclosure, including
      (1) crop displacing means for moving said middle part of said crop row portion in a generally transverse side-to-side manner to dislodge said produce from said crops, said crop displacing means including first and second displacing elements which are adapted to engage said middle part of said crop row portion therebetween,
      (2) crop forward stabilizing means, located forward of said crop displacing means, for stabilizing said forward part of said crop row portion by limiting movement of said forward part in said side-to-side manner, said forward crop stabilizing means including first and second stabilizing elements which are adapted to engage said forward part of said crop row portion therebetween,
      (3) rear crop stabilizing means, located rearward of said crop displacing means, for stabilizing said rearward part of said crop row portion by limiting movement of said rearward part in said side-to-side direction, said rear crop stabilizing means including third and fourth stabilizing elements, which are adapted to engage said rear part of said crop row portion therebetween; and
   c. crop dislodging and stabilizing drive means including motor means which are operatively connected to said crop dislodging means in a manner to cause (i) said first and second displacing elements to move in a first generally transverse direction so as to move said middle part of said crop row portion in said first transverse direction, (ii) said first and second stabilizing elements of said forward stabilizing means to move in a second transverse direction which is generally opposite to said first transverse direction in a manner to oppose movement of said forward part of said crop row portion in said first transverse direction and to inhibit movement of said forward part in said side-to-side manner, and (iii) said third and fourth stabilizing elements of said rear stabilizing means to move in the second transverse direction in a manner to oppose movement of said rearward part of said crop row portion in said first transverse direction and to inhibit movement of said rearward part in said side-to-side manner.

2. The apparatus as set forth in claim 1 wherein:
   a. said first and second displacing elements are spaced apart in a manner to engage said first and second sides of said middle part of said crop row, respectively, therebetween;
   b. said first and second stabilizing elements are spaced apart in a manner to engage said first and second sides of said forward part of said crop row, respectively, therebetween;
   c. said third and fourth stabilizing elements are spaced apart in a manner to engage said first and second sides of said rearward part of said crop row, respectively, therebetween; and
   d. said crop dislodging and stabilizing drive means are operatively connected to said crop dislodging means in a manner to cause (i) said first displacing elements to move in said first transverse direction in engagement with said first side of said crop row portion so as to cause said middle part of said crop row portion to move in said first transverse direction, (ii) said second stabilizing elements of said forward stabilizing means to move in engagement with said second side of said crop row portion in said second transverse direction to oppose movement of said forward part of said crop row portion in said first transverse direction, (iii) said first stabilizing elements to move in cooperation with said second stabilizing elements in said second transverse direction to a location where said first stabilizing elements have a substantial alignment component which is parallel to said longitudinal axis so as to engage said first side of said crop row portion forward part to inhibit movement of said forward part in said second transverse direction, (iv) said fourth stabilizing elements of said rearward stabilizing means to move in engagement with said second side of said crop row portion in said second transverse direction to oppose movement of said rearward part of said crop row portion in said first transverse direction, and (v) said third stabilizing elements to move in cooperation with said fourth stabilizing elements in said second transverse direction to a location where said third stabilizing elements have a substantial alignment component which is parallel to said longitudinal axis so as to engage said first side of said crop row portion rearward part to inhibit movement of said rearward part in said second transverse direction.

3. The apparatus as set forth in claim 2 wherein:
  a. said crop displacing means includes first and second upstanding members for supporting said first and second displacing elements, respectively, in a manner that said first and second displacing elements have a substantial horizontal alignment component, said first and second upstanding members being mounted to said frame in a manner to permit their rotation about their respective longitudinal axes to cause said movement of said first and second displacing elements in said side-to-side manner;
  b. said forward crop stabilizing means including third and fourth upstanding members for supporting said first and second stabilizing elements, respectively, in a manner that said first and second stabilizing elements have a substantial horizontal alignment component, said third and fourth upstanding members being mounted to said frame in a manner to permit their rotation about their respective longitudinal axes to cause said first and second stabilizing elements to move in said side-to-side manner;
  c. said rearward crop stabilizing means includes fifth and sixth upstanding members for supporting said third and fourth stabilizing elements, respectively, in a manner that said third and fourth stabilizing elements have a substantial horizontal alignment component, said fifth and sixth upstanding members being mounted to said frame in a manner to permit their rotation about their upstanding longitudinal axes to cause said third and fourth stabilizing elements to move in said side-to-side manner; and
  d. each of said upstanding members is rotatably mounted to said frame by means of upper and lower transversely extending sleeve members, each of said sleeve members being slidably engaged to a sleeve support which is connected to said frame, each of said sleeve members being movable in the transverse direction so as to position said displacing elements and said stabilizing elements at selective locations relative to said first and second sides of said crop row.

4. The apparatus as set forth in claim 3 wherein said crop dislodging and stabilizing drive means includes:
  a. a first drive assembly which is operatively connected between (i) said third upstanding member and said fifth upstanding member, and (ii) said motor means, in a manner to cause rotation of said third and fifth upstanding members so that said first and third stabilizing elements are moved in said side-to-side manner in the same direction;
  b. a second drive assembly which is operatively connected between (i) said fourth upstanding member and said sixth upstanding member, and (ii) said motor means, in a manner to cause said second stabilizing elements and said fourth stabilizing elements to move in said side-to-side manner in the same direction;
  c. a third drive assembly which is operatively connected between said third upstanding member and said first upstanding member in a manner that rotation of said third upstanding member in a first direction causes rotation of said first upstanding member in a second direction which is opposite to said first direction so as to cause said first displacing elements to move in a side-to-side manner in a direction which is opposite to said first and third stabilizing elements; and
  d. a fourth drive assembly which is operatively connected between said fourth upstanding member and said second upstanding member in a manner that rotation of said fourth upstanding member in said first direction causes rotation of said second upstanding member in said second direction so as to cause said second displacing elements to move in a side-to-side manner in a direction which is opposite to said second and fourth stabilizing elements.

5. The apparatus as set forth in claim 4 wherein:
  a. said motor means includes a transverse extending crank shaft having a first end portion and a second end portion;
  b. said first drive assembly includes (i) first drive rod means which are connected between said first end portion of said crank shaft and said third upstanding member, and (ii) second drive rod means which are connected between said third upstanding member and said fifth upstanding member, so as to cause said third and fifth displacing elements to move in said side-to-side manner in a substantially parallel manner;
  c. said third and first upstanding members include respective first upstanding sides, and second upstanding sides which are opposite from said first sides; and
  d. said third drive assembly includes a third drive rod means which are connected between said third upstanding member at said first side thereof and said first upstanding member at said second side thereof so that rotation of said third upstanding member in said first rotational direction causes said first upstanding member to rotate in a second rotational direction which is opposite to said first rotational direction so as to cause said first displacing elements to move in said side-to-side manner in a direction opposite to said first and third stabilizing elements.

6. The apparatus as set forth in claim 5 wherein:
  a. said second drive assembly includes (i) fourth drive rod means which are connected between said second end portion of said crank shaft and said fourth upstanding member, (ii) fifth drive rod means which are connected between said fourth upstanding member and said sixth upstanding member in a manner to cause said second and fourth displacing elements to move in said side-to-side manner in a substantially parallel manner;
  b. said fourth and second upstanding members include respective first upstanding sides and second upstanding sides which are opposite from said first sides; and
  c. said third drive assembly includes sixth drive rod means which are connected between said fourth upstanding member at said first side thereof and said second upstanding member at said second side thereof so that rotation of said fourth upstanding member in said first rotational direction causes said second upstanding member to rotate in said second rotational direction so as to cause said second displacing elements to move in said side-to-side manner in a direction opposite to said second and fourth stabilizing elements.

7. The apparatus as set forth in claim 5 wherein:
  a. said third and fifth upstanding members include third and fifth flange means which have a substantial horizontal alignment component and which extend in a generally parallel manner, said second drive rod means being pivotally connected to said third flange means and said fifth flange means at substantially equal distances from said rotational axes of said third and fifth upstanding members to cause said first and third stabilizing elements to move in said side-to-side manner in a generally parallel manner; and
  b. said first upstanding member includes a first flange means which has a substantial horizontal alignment component and which extends in a direction generally opposite from said third flange means, said third drive rod means being connected to said third flange means and said first flange means in a manner that rotation of said third upstanding member in said first rotational direction causes said first upstanding member to rotate in said second rotational direction.

8. The apparatus as set forth in claim 3 wherein:
  a. each of said upstanding members has a first inner side and a second outer side;
  b. said displacing elements and said stabilizing elements each have an inner end and an outer end, each of said inner ends being mounted to said inner side of said upstanding member so as to position said inner end and said outer end of said element in engagement with said crop row portion.

9. The apparatus as set forth in claim 3 wherein said first and second upstanding members are caused to rotate through a greater arc than said third, fourth, fifth and sixth upstanding members so that said first and second displacing elements move in said side-to-side manner through a greater distance than said first, second, third and fourth stabilizing elements.

10. The apparatus as set forth in claim 9 wherein said third upstanding member is caused to rotate through a greater arc by (i) mounting said third drive rod means to said first upstanding member at a first radial distance from the longitudinal axis of said first upstanding member, and (ii) mounting said third drive rod means to said third upstanding member at a second radial distance from the longitudinal axis of said third upstanding member, in a manner that said first distance is less than said second distance.

11. Apparatus for harvesting produce from a row, having first and second longitudinally extending sides, of upstanding crops, said crops being characterized in a manner that movement of a part of said row is transmitted along said row to other parts of said row, said apparatus comprising:
  a. a movable frame including an upstanding enclosure which has a forward opening and a rearward opening and which is adapted to receive a portion of said crop row therein, said crop row portion including a forward part, a middle part and a rearward part, said frame having a longitudinal axis which extends between said forward opening and said rearward opening, and a transverse axis;
  b. crop dislodging means which are operatively connected to said frame inside said enclosure, said crop dislodging means including
    (1) crop displacing means for moving said middle part of said crop row portion in a generally transverse side-to-side manner, said crop displacing means including first and second transversely spaced apart displacing elements which are adapted to engage said first and second sides of said middle part of said crop row portion therebetween,
    (2) crop stabilizing means, located forward of said crop displacing means, for limiting movement of said forward part of said crop row portion in said side-to-side manner, said forward crop stabilizing means including first and second transversely spaced apart stabilizing elements which are adapted to engage said first and second sides of said forward part of said crop row portion therebetween; and
  c. crop dislodging and stabilizing drive means, including motor means, which are operatively connected to said crop dislodging means in a manner to cause (i) said first displacing elements to move in a first general transverse direction in engagement with said first side of said crop row portion so as to cause said middle part of said crop row portion to move in said first generally transverse direction, (ii) said second stabilizing elements of said forward crop stabilizing means to move in engagement with said second side of said crop row portion in a second generally transverse direction which is generally opposite to said first transverse direction to oppose movement of said forward part of said crop row portion in said first transverse direction.

12. The apparatus as set forth in claim 11 wherein said crop dislodging and stabilizing drive means are operatively connected to said crop dislodging means in a manner to cause said first stabilizing elements to move in cooperation with said second stabilizing elements in said second transverse direction to a location where said first stabilizing elements have a substantial alignment component which is parallel to said longitudinal axis so as to engage said first side of said crop row portion forward part to inhibit movement of said forward part in said second transverse direction and to inhibit said transmission of movement of said middle part to other parts of said crop row which are located outside said enclosure.

13. A method of harvesting produce, such as berries, from a row of upstanding crops having first and second longitudinally extending sides, the crop rows being characterized in a manner that movement of a part of the row is transmitted in a longitudinal direction to other parts of the row, the method comprising the steps of:
  a. receiving a portion of the crop row, having a forward part, a middle part and a rearward part, within a moveable enclosure having a forward opening for receiving the crop row portion therewithin and a rearward opening for discharging the crop row portion therefrom;
  b. moving the middle part of the crop row portion in a generally transverse side-to-side manner within the enclosure to dislodge the produce from the crops;
  c. limiting movement of the forward part of the crop row portion in the side-to-side manner by engaging the first and second sides of the forward part of the crop row portion so that when the middle part moves in the first transverse direction, the forward part is caused to move in a second direction having a substantial transverse alignment component which is generally opposite to the first transverse direction in a manner to oppose movement of the forward part of the crop row portion in the first transverse direction and to inhibit transmission of movement of the middle part to other portions of the crop row which are located outside the enclosure; and d. limiting movement of the rearward part of the crop row portion in the side-to-side manner by engaging the rearward part of the crop row portion so that when the middle part of the crop row portion moves in the first transverse direction, the rearward part is caused to move in the second transverse direction to oppose movement of the middle part of the crop row portion in the first transverse direction and to inhibit movement of the rearward part in the side-to-side manner and to inhibit the transmission of movement of the middle part to the other portions of the crop row which are located outside the enclosure.

14. The method as set forth in claim 13 wherein:

a. during the moving step 14b, the middle part of the crop row portion is moved by first and second displacing elements;

b. movement of the forward part of the crop row portion is limited by engaging the first and second sides of the forward part between first and second stabilizing elements so that when the first and second displacing elements move in the direction so as to move the middle part of the crop row portion in the first transverse direction, the first and second stabilizing elements are caused to move in the second transverse direction in a manner to oppose movement of the forward part of the crop row portion in the first transverse direction and to inhibit movement of the forward part in a side-to-side manner; and c. movement of the rearward part of the crop row portion is limited by engaging the first and second sides of the rearward part between third and fourth stabilizing elements so that when the first and second displacing elements move in the first transverse direction so as to move the middle part of the crop row portion in the first transverse direction, the third and fourth stabilizing elements are caused to move in the second transverse direction to oppose movement of the middle part of the crop row portion in the first transverse direction and to inhibit movement of the rearward part in the side-to-side manner.

15. The method as set forth in claim 14 additionally comprising the steps of:

a. moving said first displacing elements in said first transverse direction in engagement with said first side of said crop row portion so as to cause said middle part of said middle part of said crop row portion to move in said first transverse direction;

b. moving the second stabilizing elements of said forward stabilizing means in engagement with the second side of the crop row portion in the second transverse direction to oppose movement of the forward part of the crop row portion in the first transverse direction;

c. moving the first stabilizing elements in cooperation with the second stabilizing elements in the second transverse direction to a location where the first stabilizing elements have a substantial alignment component which is parallel to the longitudinal axis so as to engage the first side of the crop row portion forward part to inhibit movement of the forward part in the second transverse direction;

d. moving the fourth stabilizing elements of the rearward stabilizing means in engagement with the second side of the crop row portion in the second transverse direction to oppose movement of the rearward part of the crop row portion in the first transverse direction; and e. moving the third stabilizing elements in cooperation with the fourth stabilizing elements in the second transverse direction to a location where the third stabilizing elements have a substantial alignment component which is parallel to the longitudinal axis so as to engage the first side of the crop row portion rearward part in order to inhibit movement of the rearward part in the second transverse direction.

16. The method as set forth in claim 15 additionally comprising the step of moving the first and second displacing elements in the side-to-side manner through a greater distance than the first, second, third and fourth stabilizing elements.

17. Apparatus for harvesting produce from a row, having first and second longitudinally extending sides, of upstanding crops, said crops being characterized in a manner that movement of a part of said row is transmitted along said row to other parts of said row, said apparatus comprising:

a. a movable frame including an upstanding enclosure which has a forward opening and a rearward opening and which is adapted to receive a portion of said crop row therein, said crop row portion including a forward part and a rearward part, said frame having a longitudinal axis which extends between said forward opening and said rearward opening, and a transverse axis;

b. crop dislodging means which are operatively connected to said frame inside said enclosure, said crop dislodging means including (1) crop displacing means for moving said forward part of said crop row portion in a generally transverse side-to-side manner, said crop displacing means including first and second transversely spaced apart displacing elements which are adapted to engage said first and second sides of said forward part of said crop row portion therebetween, (2) crop stabilizing means, located rearward of said crop displacing means, for limiting movement of said rearward part of said crop row portion in said side-to-side manner, said rearward crop stabilizing means including first and second transversely spaced apart stabilizing elements which are adapted to engage said first and second sides of said rearward part of said crop row portion therebetween; and c. crop dislodging and stabilizing drive means, including motor means, which are operatively connected to said crop dislodging and stabilizing means in a manner to cause (i) said first displacing elements to move in a first general transverse direction in engagement with said first side of said crop row portion so as to cause said forward part of said crop row portion to move in said first generally transverse direction, (ii) said second stabilizing elements of said crop stabilizing means to move in engagement with said second side of said crop row portion in a second generally transverse direction which is generally opposite to said first transverse direction to oppose movement of said rearward part of said crop row portion in said first transverse direction.

* * * * *